May 7, 1929.  H. I. N. YOST  1,711,712
AUTOMOBILE PEDAL
Original Filed Aug. 27, 1926
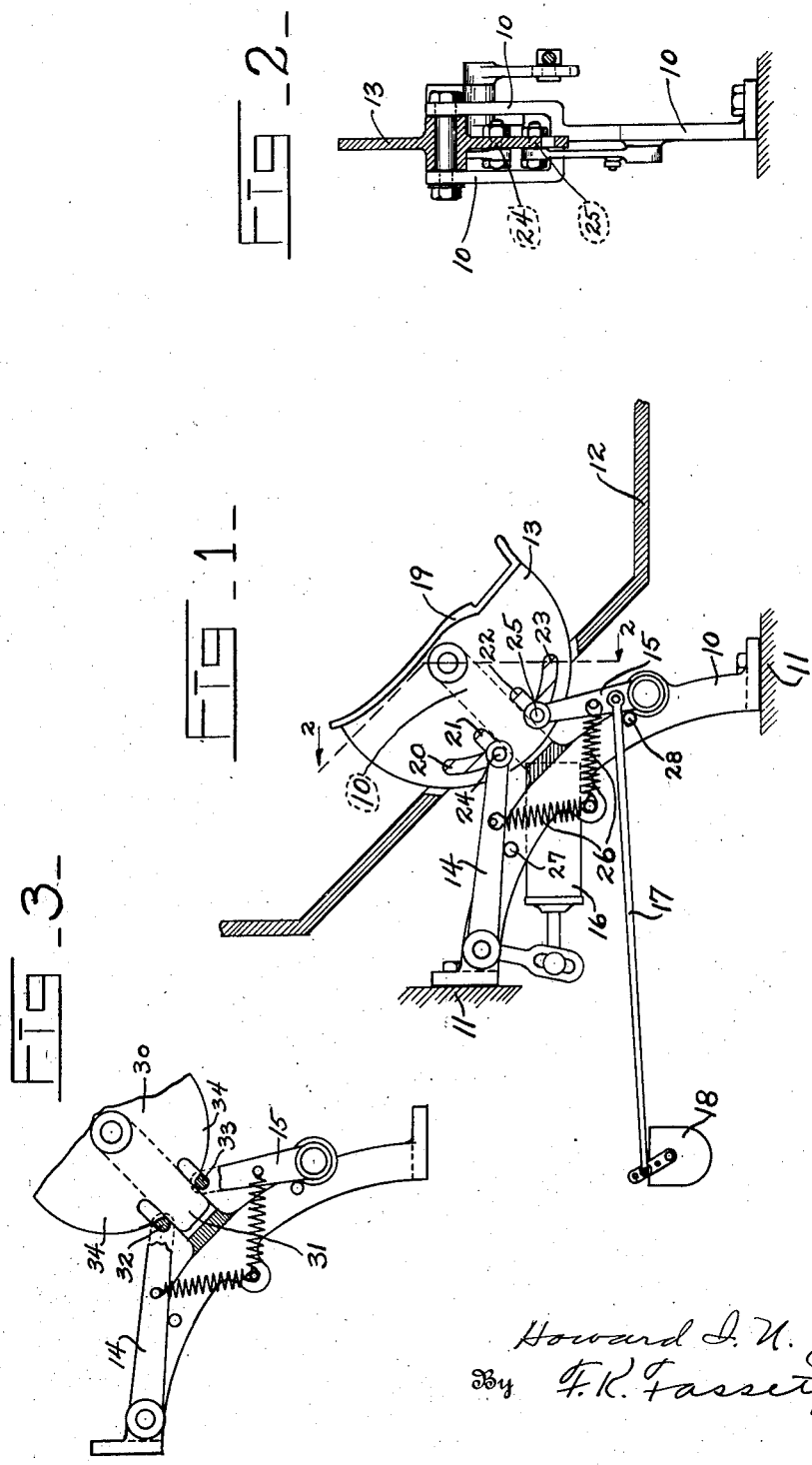
Inventor
Howard I. N. Yost,
By F. K. Fassett,
Attorney.

Patented May 7, 1929.

1,711,712

UNITED STATES PATENT OFFICE.

HOWARD I. N. YOST, OF DAYTON, OHIO.

AUTOMOBILE PEDAL.

Application filed August 27, 1926, Serial No. 131,838. Renewed March 19, 1929

My invention relates to mechanism for controlling the brakes and the fuel supply of an automobile or other motor vehicle from a single pedal located near the driver's seat.

One object of my invention is to provide a mechanism which will permit an automobile driver to operate the accelerator or apply the brakes without moving his foot from one pedal to another. Another object is to provide means for locking the mechanism for controlling the carburetor while the brakes are being applied, and also means for locking the brake control while the brakes are not in use. Another object is to provide means for supporting the control pedal independently of the mechanism it operates. Other objects and advantages will either become apparent or will be specifically referred to as I proceed with the description of my invention.

In the accompanying drawing Fig. 1 shows an elevation of a mechanism operated by a single pedal, for controlling the brakes and carburetor of an automobile;

Fig. 2 is a view taken ninety degrees to the right of the view shown in Fig. 1, and having parts shown in section; and Fig. 3 shows a modification of the structure shown in Fig. 1.

The drawings are in some respects diagrammatic.

I shall describe my invention by referring first to Fig. 1 in which a frame 10, secured to the chassis of an automobile at 11—11 and having a portion extending thru the floor board 12 of the machine, forms a support on which a semi-circular disk 13 and operating levers 14 and 15 are journaled. The lever 14 is connected by suitable members to a cylinder 16, forming part of the brake mechanism. The lever 15 is connected by means of a rod 17 to the carburetor 18, so that movement of the lever 15 operates the carburetor.

Cast integral with the disk 13 is a pedal plate 19 adapted to support the driver's foot. Slots 20—21 and 22—23, cut in the disk, are adapted to cooperate, respectively, with studs 24 and 25 secured in the ends of the levers 14—15, respectively. For reasons which will presently appear slots 20 and 23 are made arcual with reference to the axis of the disk. Levers 14 and 15 are normally held in the position shown in Fig. 1 by springs 26.

I shall now describe the operation of my device: Rocking the pedal 13—19 clockwise, as seen in Fig. 1, causes the lower edge of the slot 21 to bear on the stud 24 and rock the lever 14 counterclockwise. This operates the brake mechanism. At the same time slot 23 moves over the stud 25, but because of the arcuate form of the slot the lever 15 is not moved; instead, the lever becomes locked against movement. Rocking the pedal counter-clockwise causes the upper edge of the slot 22 to bear on the stud 25 and rock the lever 15. This operates the carbureter. At the same time the lever 14 becomes locked by the slot 20.

Normally the springs 26 hold the levers 14 and 15 against their respective stops 27 and 28. If desired, however, in the structure shown in Fig. 1, these stops might be eliminated because the outer edges of the slots 20 and 23 also serve as stops for the levers. In order to hold the levers with sufficient firmness in their home positions, the springs 26 should be given a substantial initial tension. This initial tension of the springs also serves to center the pedal 13—19. That is, whenever the operator removes his foot from the pedal, if the pedal is away from its central or neutral position, it will be returned to that position by one or the other of the springs 26, thru the action of the lever belonging thereto. The springs also serve to inform the operator when the pedal is in its neutral position, as there is then no tendency for the pedal to move and the operator knows this from his sense of touch. Having a pedal to accommodate the operator's whole foot, and whereby the operator is enabled to operate the carbureter or brake by merely rocking the pedal one way or the other, has certain advantages over a pedal upon which the operator places only a portion of his foot, because it gives the operator a better footing and makes his position in his seat more secure. This secure footing is due to the fact that the pedal is mounted upon a support independent of the devices the pedal is designed to operate.

In Fig. 3, the disk 30, corresponding to the disk 13 of Fig. 1, has no slots. Instead, it has the member 31 adapted to bear against the stud 32 and rock the lever 14 when the pedal is moved clockwise, or bear against the stud 33 and rock the lever 15 when the pedal is rocked counter-clockwise. The arcuate members 34—34 lock the lever which is not being moved. It will be noticed that the studs 32 and 33 have corners which cooperate with the corners of the members 34—34, so the locking function takes place the moment the pedal is moved from its central position. This structure is useful in some cases, but ordinarily the structure shown in Fig. 1 locks the levers soon enough, particularly since the levers can move but a small distance when the pedal is central, even in the Fig. 1 construction.

While I have described what I now regard as the preferred embodiment of my invention, it is to be understood that the structure shown is susceptible of modification without departing from the spirit of my invention or exceeding the scope of my claims.

What I claim is as follows:

1. A device for controlling a motor vehicle, comprising: a lever for controlling the brakes, a lever for controlling the fuel supply of the vehicle, a pedal adapted to actuate either of said levers and means for locking either lever while the other is being operated.

2. A device for controlling a motor vehicle, comprising: mechanism for controlling the brakes, mechanism for controlling the fuel supply of the vehicle, a pedal adapted to operate either of said mechanisms, and means for locking either mechanism while the other is being operated.

3. A device for controlling a motor vehicle, comprising: a lever for controlling the brakes, a lever for controlling the fuel supply of the vehicle, and a pedal whereby to operate one or the other of said levers, at the option of the driver, the fulcrums of said levers and of said pedal being immovable relative to each other.

4. A device for controlling a motor vehicle, comprising: a lever for controlling the brakes, a lever for controlling the fuel supply of the vehicle, and a pedal whereby to operate one or the other of said levers, at the option of the driver, the fulcrums of said levers and of said pedal being carried by the chassis of the vehicle, thereby rendering the fulcrums immovable relative to each other.

5. A device for controlling a motor vehicle, comprising: a lever for controlling the brakes, a lever for controlling the fuel supply of the vehicle, and a pedal whereby to operate one or the other of said levers, at the option of the driver, a spring for each of said levers whereby to return the lever to the position whence the pedal moved it and to hold the lever in said position with a substantial tension, and a stop for each lever whereby each spring is kept from any tendency to move the other lever through the medium of the pedal.

6. A device for controlling a motor vehicle, comprising: a lever for controlling the brakes, a lever for controlling the fuel supply of the vehicle, a pedal adapted to actuate either of said levers, and means for maintaining either lever in an inoperative condition while the other lever is being operated.

HOWARD I. N. YOST.